(12) United States Patent
Iio et al.

(10) Patent No.: US 7,306,013 B2
(45) Date of Patent: Dec. 11, 2007

(54) FUEL HOSE

(75) Inventors: Shinji Iio, Komaki (JP); Kazutaka Katayama, Kasugai (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 197 days.

(21) Appl. No.: 11/216,109

(22) Filed: Sep. 1, 2005

(65) Prior Publication Data

US 2006/0042712 A1  Mar. 2, 2006

(30) Foreign Application Priority Data

Sep. 2, 2004   (JP) ............................. 2004-256040

(51) Int. Cl.
*F16L 11/04*   (2006.01)

(52) U.S. Cl. ...................... 138/137; 138/141; 138/140; 428/36.91

(58) Field of Classification Search ................ 138/137, 138/140, 141; 428/36.91
See application file for complete search history.

(56) References Cited

U.S. PATENT DOCUMENTS

| | | | | |
|---|---|---|---|---|
| 4,347,268 A | * | 8/1982 | Close ...................... | 427/385.5 |
| 4,421,878 A | * | 12/1983 | Close ......................... | 523/454 |
| 4,887,647 A | * | 12/1989 | Igarashi et al. ............. | 138/126 |
| 5,653,266 A | | 8/1997 | Reynolds et al. ........... | 138/137 |
| 5,678,611 A | | 10/1997 | Noone et al. ............... | 138/137 |
| 5,743,304 A | | 4/1998 | Mitchell et al. ............ | 138/137 |
| 5,865,218 A | | 2/1999 | Noone et al. ............... | 138/137 |
| 5,964,251 A | | 10/1999 | Reynods et al. ............ | 138/137 |
| 6,345,647 B2 | | 2/2002 | Niki et al. .................. | 138/126 |
| 2002/0174906 A1 | | 11/2002 | Katayama et al. ......... | 138/109 |
| 2004/0175573 A1 | * | 9/2004 | Fujihana ................... | 428/423.1 |
| 2004/0256017 A1 | | 12/2004 | Arima et al. ............... | 138/126 |

FOREIGN PATENT DOCUMENTS

| | | |
|---|---|---|
| EP | 1 362 890 | 11/2003 |
| JP | 08-086387 | 4/1996 |

* cited by examiner

*Primary Examiner*—Patrick F. Brinson
(74) *Attorney, Agent, or Firm*—Westerman, Hattori, Daniels & Adrian, LLP.

(57) ABSTRACT

A fuel hose which is excellent in antistatic property, sour gasoline resistance, a sealing property and the like. The fuel hose includes a polyamide resin inner layer 1 and an electrically conductive coating layer 2 which is formed by the following essential components (A) to (C):
(A) fluororubber;
(B) an electrically conductive agent; and
(C) a crosslinking agent including (a) polyhydroxy aromatic compound and a quaternary ammonium salt or (b) an amine crosslinking agent,
the electrically conductive coating layer being provided on the inner peripheral surface of the polyamide resin inner layer over the entire length thereof.

8 Claims, 1 Drawing Sheet

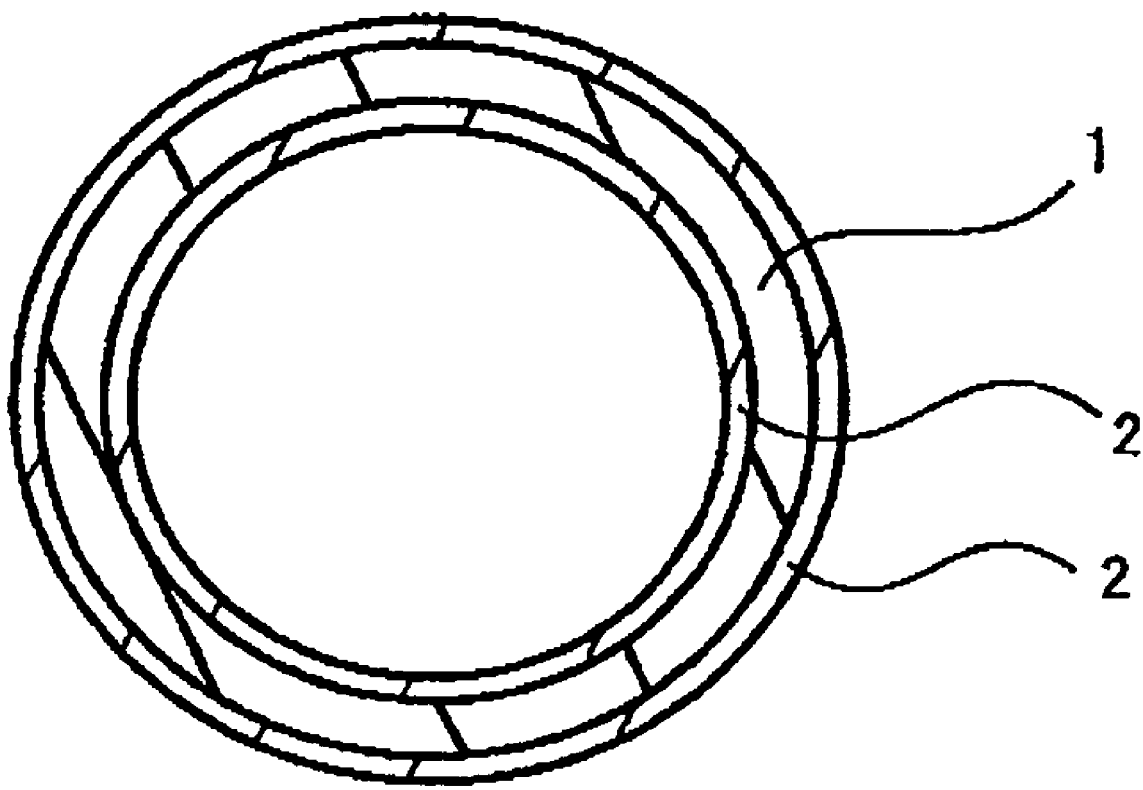
Figure

FUEL HOSE

BACKGROUND OF THE INVENTION

1. Field of the Invention

The present invention relates to a fuel hose for use as a fuel transportation pipe for transporting an automotive fuel such as a gasoline, an alcohol-containing gasoline (gasohol), an alcohol, hydrogen, light oil, dimethyl ether, liquified petroleum gas (LPG) or compressed natural gas (CNG).

2. Description of the Art

As a fuel hose such as a gasoline transportation hose, a hose formed by a polyamide resin has conventionally been used because it is a low-cost material. Examples of such a hose include a multilayered hose formed by laminating a resin layer other than polyamide resin on a polyamide resin layer as well as a single-layer hose formed only by a polyamide resin. However, even in such a multilayered hose, a polyamide resin is generally used as an innermost layer because it is excellent in fuel resistance and low-temperature impact resistance.

If static electricity is generated by abrasion between an inner surface of the above-mentioned fuel hose and the fuel such as gasoline which flows in the hose, accidents such as ignition of a fuel (gasoline) may occur. To help prevent accidents, it is very important that electrical conductivity (antistatic property) is imparted to the hose so as to allow static electricity to escape out of the hose. The electrical conductivity is generally imparted, for example, by involving carbon black in the innermost layer (polyamide resin layer) (for example, see Unexamined patent Publication No. 8-86387).

However, the polyamide resin has a limitation in sour gasoline resistance (resistance to a sour gasoline generated through oxidation of a gasoline) which is an important property required for the fuel transportation hose. In addition, when the polyamide resin includes carbon black, it is thought that the carbon black may activate peroxides in the fuel, which may further aggravate the sour gasoline resistance. If electrical conductivity (antistatic property) is ensured by increasing the amount of the carbon black, substantial amount thereof is required until the desired electrical conductivity is ensured, which may lead to deteriorated sealing property and deteriorated flexibility of the hose.

In view of the foregoing, it is an object of the present invention to provide a fuel hose which is excellent in antistatic property, sour gasoline resistance, a sealing property and the like.

SUMMARY OF THE INVENTION

In accordance with the present invention to achieve the aforesaid object, there is provided a fuel hose comprising a polyamide resin inner layer and an electrically conductive coating layer which is formed by the following essential components (A) to (C):

(A) fluororubber;
(B) an electrically conductive agent; and
(C) a crosslinking agent comprising (a) polyhydroxy aromatic compound and a quaternary ammonium salt or (b) an amine crosslinking agent, the electrically conductive coating layer being provided on the inner peripheral surface of the polyamide resin inner layer over the entire length thereof.

The inventors of the present invention conducted studies to solve the above-mentioned problems. During their studies, they had the idea that antistatic property is imparted by forming a thin electrically conductive coating layer on the inner peripheral surface of the polyamide resin inner layer over the entire length thereof, instead of involving carbon black in the polyamide resin inner layer. As a result of further research and development on materials suitable for the electrically conductive coating layer, the inventors found that, when the electrically conductive coating layer is formed by fluororubber, an electrically conductive agent (such as carbon black or an ion-conductive agent), and a specific crosslinking agent, the intended object can be achieved. Thus, the present invention has been attained. In the present invention, "essential component" is an opposing expression to "optional component" and means that such a component is necessarily contained in terms of composition, and no quantitative restrictions are imposed thereon.

As described above, the fuel hose of the present invention is provided with an electrically conductive coating layer formed by fluororubber, an electrically conductive agent, and a specific crosslinking agent over the entire length of the inner peripheral surface of the polyamide resin inner layer. For this reason, the fuel hose of the present invention is excellent in antistatic property, sour gasoline resistance, sealing property, gasoline permeation resistance and the like. Especially, the hose of the present invention can exert its excellent capability as a fuel transportation pipe for transporting an automotive fuel. Further, since addition of carbon black to the polyamide resin inner layer material is not necessary or the amount thereof can be reduced, sealing property of the hose can be further improved, which effectively prevents fuel leakage.

Especially, when the electrically conductive coating layer has a thickness of 3 to 20 µm, the sealing property thereof can effectively be ensured.

When the electrically conductive coating layer has an electrical resistance of $1.0 \times 10^8$ Ω·cm or less, antistatic property can be further improved.

When the coating layer is formed by the essential components of fluororubber and a specific cross linking agent on an outer peripheral surface of the above-mentioned hose, deterioration such as corrosion by an anti-freezer and the like can effectively be prevented.

BRIEF DESCRIPTION OF THE DRAWING

The sole FIGURE of the drawing is a sectional diagram illustrating the construction of an exemplary fuel hose according to the present invention.

DESCRIPTION OF THE PREFERRED EMBODIMENTS

The present invention will hereinafter be described in detail by way of embodiments thereof.

As shown in the FIGURE, a fuel hose according to the present invention includes a polyamide resin inner layer 1 and a thin electrically conductive coating layer 2 formed on the inner peripheral surface of the polyamide resin inner layer 1 over the entire length thereof. The electrically conductive coating layer 2 formed on the outer peripheral surface of the polyamide resin inner layer 1 is optionally provided, as required, which may be omitted, if unnecessary.

The polyamide resin for forming the polyamide resin inner layer 1 is not limited to fatty series, aromatic series and the like, and examples thereof include lactam polymers, a condensate of a diamine and a dicarboxylic acid, polymers of amino acids, and copolymers and blends thereof. Specific examples thereof include, for example, polyamide 6 (PA6), polyamide 66 (PA66), polyamide 99 (PA99), polyamide 610 (PA610), polyamide 612 (PA612), polyamide 11 (PA11), polyamide 912 (PA912), polyamide 12 (PA12), a copolymer of polyamide 6 and polyamide 66 (PA6/66) and a copolymer of polyamide 6 and polyamide 12 (PA6/12), which may be used either alone or in combination.

The electrically conductive coating layer 2 formed on the inner peripheral surface of the polyamide resin inner layer 1 over the entire length thereof is formed by fluororubber (component (A)), an electrically conductive agent (component (B)) and a specific crosslinking agent (component (C)).

The fluororubber (component (A)) is not particularly limited. Examples thereof include a vinylidene fluoride-chlorotrifluoroethylene copolymer, a vinylidene fluoride-hexafluoropropylene copolymer, a vinylidene fluoride-hexafluoropropylene-tetrafluoroethylene terpolymer, a tetrafluoroethylene-propylene copolymer, a vinylidene fluoride-tetrafluoroethylene-propylene terpolymer, a blend of vinylidene polyfluoride and acrylic rubber.

The electrically conductive agent (component (B)) used with the fluororubber (component (A)) is not particularly limited. Examples thereof include electron-conductive agents such as carbon black and ion-conductive agents. Specific examples of the electron-conductive agent include metallic powder such as aluminum powder or stainless powder; metal oxides such as c-ZnO (electrically conductive zinc oxide), $c-TiO_2$ (electrically conductive titanium dioxide), $c-Fe_3O_4$ (electrically conductive iron oxide) and $c-SnO_2$ (electrically conductive stannous dioxide); and metal powder such as graphite, carbon nano-tubes and carbon black. Specific examples of the ion-conductive agent include phosphoric ester, sulfonate, aliphatic polyalcohol and aliphatic alcohol sulfate. These may be used either alone or in combination. In the present invention, the expression "c-" means electrically conductive.

The electrically conductive agent (component (B)) is preferably present in an amount of 10 to 40 parts by weight (hereinafter just abbreviated to "parts"), more preferably 15 to 30 parts, based on 100 parts of the fluororubber (component (A)). When the electrically conductive agent (component (B)) is less than 10 parts, it is difficult to obtain intended electrical conductivity. When the electrically conductive agent (component (B)) exceeds 40 parts, the resultant hose tends to have poor flexibility.

The specific crosslinking agent (component (C)) used with the fluororubber (component (A)) and the electrically conductive agent (component (B)) comprises (a) polyhydroxy aromatic compound and a quaternary ammonium salt or (b) an amine crosslinking agent.

The examples of the polyhydroxy aromatic compound of the component (a) include 2,2-bis(4-hydroxyphenyl)propane (so-called "bisphenol A"), 2,2-bis(4-hydroxyphenyl)perfluoropropane (so-called "bisphenol AF"), resorcin, 1,3-trihydroxybenzene, 1,7-dihydroxy naphthalene, 2,7-dihydroxy naphthalene, 1,6-dihydroxy naphthalene, 4,4'-dihydroxy diphenyl, 4,4'-dihydroxy stilbene, 2,6-dihydroxy anthracene, hydroquinone, catechol, 2,2-bis(4-hydroxyphenyl)butane (so-called "bisphenol B"), 4,4-(4-hydroxyphenyl)valerate, 2,2-bis(4-hydroxyphenyl)tetrafluorodichloropropane, 4,4'-dihydroxy diphenyl sulfone, 4,4'-dihydroxy diphenyl ketone, tri(4-hydroxyphenyl)methane, 3,3',5,5'-tetrachlorobisphenol A and 3,3',5,5'-tetrabromobisphenol A, and alkali metal salts and alkali earth metal salts thereof. These may be used either alone or in combination.

The polyhydroxy aromatic compound is preferably present in an amount of 0.5 to 5 parts based on 100 parts of the fluororubber (component (A)). When the polyhydroxy aromatic compound is less than 0.5 parts, crosslinking is insufficient so that sufficient strength may not be obtained. When the polyhydroxy aromatic compound exceeds 5 parts, the resultant hose tends to be too rigid and has poor flexibility.

Examples of the quaternary ammonium salt of the component (a) include 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium-methylsulphate, 8-ethyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride and 8-(3-phenylpropyl)-1,8-diaza-bicyclo[5.4.0]-7-undecenium chloride; phenyltrimethylammonium chloride, phenyltrimethylammonium bromide, phenyltrimethylammonium hydrogen sulfate, phenyltriethylammonium chloride and phenyltrioctylammonium bromide; 1,8-diaza-bicyclo[5.4.0]-7-undecenium octanoate, 1,8-diaza-bicyclo[5.4.0]-7-undecenium nonanoate, 1,8-diaza-bicyclo[5.4.0]-7-undecenium decanoate, 1,6-diaza-bicyclo[4.3.0]-nonenium octanoate, tetrabutylammonium octanoate, tetrabutylammonium nonanoate, trioctylmethylammonium octanoate and trioctylmethylammonium nonanoate; 1,8-diaza-bicyclo[5.4.0]-7-undecenium formate, 1,6-diaza-bicyclo[4.3.0]-5-nonenium formate, tetrabutylammonium formate and trioctylmethylammonium formate; tetrabutylammonium hydrogen sulfate, tetrametylammonium hydrogen sulfate, benzyltributylammonium hydrogen sulfate, trioctylmethylammonium hydrogen sulfate, 1,8-diaza-bicyclo[5.4.0]-7-undecenium hydrogen sulfate and 8-methyl-1,8-diaza-bicyclo[5.4.0]-7-undecenium hydrogen sulfate. They may be used either alone or in combination. Among them, diazabicyclo undecenium salts are preferred because it improves a vulcanizing property.

The quaternary ammonium salt is preferably present in an amount of 0.1 to 5 parts based on 100 parts of the fluororubber (component (A)). When the quaternary ammonium salt is less than 0.1 parts, vulcanizing adhesion may be insufficient. When the quaternary ammonium salt exceeds 5 parts, it tends to be difficult to control vulcanization.

Examples of the amine crosslinking agent (component (b)) include, for example, N,N'-dicinnamilidene-1,6-hexanediamine, tetraethylenepentamine, 1,6-hexanediamine, triethylenetetramine, triethylenediamine, hexamethylenediamine carbamate, ethylenediamine carbamate and alicyclic amine salts. These may be used either alone or in combination.

The amine crosslinking agent is preferably present in an amount of 0.5 to 5 parts based on 100 parts of the fluororubber (component (A)). When the amine crosslinking agent is less than 0.5 parts, vulcanizing adhesion may be insufficient so that sufficient strength may not be obtained. When the amine crosslinking agent exceeds 5 parts, the resultant hose tends to become too rigid and has poor flexibility.

In addition to the above-mentioned components (A) to (C), metal oxides such as magnesium oxide or calcium oxide, or metal hydroxides such as calcium hydroxide may be added to the material for forming the electrically conductive coating layer 2, as required. In addition, one or more of a co-crosslinking agent, a reinforcing agent, a white filler, a plasticizer, a vulcanizing agent, a vulcanizing accelerator, a process aid, an anti-aging agent, a flame retardant and the like may be added to the material for forming the electrically conductive coating layer 2, as required. Further, solvents such as water, ketones, esters and ethers are generally used for the material for forming the electrically conductive coating layer 2 to improve coating performance. When the material for forming the electrically conductive coating layer 2 is dispersed in water, a dispersant such as lauryl sulfate is appropriately used. Further, in addition, coating additives such as silicone oil, or solvents such as toluene or xylene may be used.

The fuel hose of the present invention is produced, for example, in the following manner. The polyamide resin inner layer 1 is formed by extruding the polyamide resin by means of an extruder. On the other hand, each material of the above-mentioned components (A) to (C) is prepared and other materials are also prepared, as required, and thus prepared materials are kneaded by means of a kneading machine such as a roll, a kneader, a Banbury mixer or a twin screw extruder so as to prepare a rubber compound. Further, the thus prepared rubber compound is dissolved in a solvent, as required, and dispersed by means of a sand mill or the like. Thus, the material for forming the electrically conductive coating layer 2 (coating liquid) can be prepared. Then, the thus prepared coating liquid is coated on at least the inner peripheral surface of both (inner and outer) peripheral surfaces of the polyamide resin inner layer 1. The coating method thereof is not particularly limited and conventional methods such as a dipping method, a spray coating method and a roll coating method may be used. The thus coated product is dried and heated, so that the solvent in the coating liquid is removed by evaporation for forming the electrically conductive coating layer 2. Thus, the intended fuel hose can be produced. The fuel hose, as shown in the FIGURE, is formed by a dipping method, and thus an electrically conductive coating layer 2 is formed on the outer peripheral surface of the hose, as well as the inner peripheral surface thereof.

Each layer thickness of the thus obtained fuel hose varies depending on its application. However, the polyamide resin inner layer 1 of the fuel hose typically has a thickness of 0.05 mm to 2.0 mm, preferably 0.1 mm to 1.5 mm. The electrically conductive coating layer 2 formed on the inner peripheral surface of the polyamide resin inner layer 1 typically has a thickness of 3 μm to 20 μm, preferably 3 μm to 15 μm. When the thickness of the electrically conductive coating layer 2 is less than 3 μm, it is difficult to ensure sealing property. When the thickness of the electrically conductive coating layer 2 exceeds 20 μm, the difficult insertion of a metallic pipe or the like tends to occur. The inner diameter of the fuel hose varies depending on its application. However, the inner diameter is generally 2 mm to 60 mm, preferably 4 mm to 50 mm.

The electrically conductive coating layer 2 formed on the inner peripheral surface of the polyamide resin inner layer 1 has preferably an electrical resistance of $1.0 \times 10^8$ Ω·cm or less, more preferably $1.0 \times 10^6$ Ω·cm, because antistatic property can be improved.

When the electrically conductive coating layer 2 is formed on the outer peripheral surface of the fuel hose, as shown in the FIGURE, deterioration due to corrosion by an anti-freezer and the like can effectively be prevented. The fuel hose of the present invention is used mainly as an automotive fuel hose. Therefore, if an anti-freezer is attached to the layer including a polyamide resin during use, calcium chloride, which is a main ingredient of the anti-freezer, tends to deteriorate such a layer. Especially, the polyamide 6 is used as a polyamide resin, remarkable deterioration is observed. If such deterioration occurs, cracking is caused on the portion of the hose where the stress is applied. For this reason, to prevent such deterioration, it is preferred to form the electrically conductive coating layer 2 on the outer peripheral surface of the hose. Further, since the electrical conductivity is not necessarily required on the outer peripheral surface of the hose, a coating layer may be formed using the essential components (the components (A) and (C)) except for the electrically conductive agent instead of the electrically conductive coating layer 2, which brings about the same effect as above (effectiveness of protecting deterioration due to corrosion).

The structure of the inventive fuel hose is not limited to the two-layer structure where the electrically conductive coating layer 2 is formed on the inner peripheral surface of the polyamide resin inner layer 1, and the three-layer structure, as shown in the FIGURE, where a coating layer such as another electrically conductive coating layer 2 is formed on the outer peripheral surface of the polyamide resin inner layer 1 of the two-layer structure. In other words, a resin layer other than polyamide resin, a rubber layer, a reinforcing fiber layer and the like may be formed on the outer peripheral surface of the polyamide resin layer 1.

The fuel hose of the present invention is advantageously employed as an automotive fuel hose. However, its application is not limited thereto. In addition, the fuel hose of the present invention may be employed as a fuel hose for a tractor or a farm tractor.

Next, an explanation will be given to examples and comparative examples.

EXAMPLE 1

Preparation of Material for Forming Electrically Conductive Coating Layer (Coating Liquid)

A coating liquid having 20% solid content was prepared by kneading 100 parts of fluororubber (Viton A available from DuPont Performance Elastomers), 3 parts of N,N'-dicinnamilidene-1,6-hexanediamine (Diak #3 available from DuPont), 20 parts of carbon black (Ketjen Black EC available from Ketjen Black International Company) and 15 parts of magnesium oxide (Kyowa Mag #30 available from Kyowa Chemical Industry Co., Ltd) by means of a kneader, and further adding a solvent (MEK) thereto, and then mixing and stirring thereof.

Production of Fuel Hose

A polyamide 11 was extruded into a hose shape, so that a polyamide resin layer having an inner diameter of 6.0 mm and a thickness of 1.0 mm was formed, In turn, the inner and the outer peripheral surfaces of the polyamide resin layer were dipped into the coating liquid prepared in the above-mentioned manner and vulcanized at 160° C. for 30 minutes for forming a coating layer having a thickness of 10 μm. Thus, an intended fuel hose, as shown in the FIGURE, was produced.

EXAMPLE 2

A polyamide 12 was extruded into a hose shape, so that a polyamide resin layer having an inner diameter of 6.0 mm and a thickness of 1.0 mm was formed. In turn, the inner and the outer peripheral surfaces of the polyamide resin layer were dipped into the coating liquid prepared in the same manner as in the Example 1 and vulcanized at 160° C. for 30 minutes for forming a coating layer having a thickness of 10 μm. Thus, an intended fuel hose, as shown in the FIGURE, was produced.

EXAMPLE 3

First, polyamide 6, an ethylene-vinyl alcohol copolymer (EVOH: EVAL EP-F101 available from KURARAY CO., LTD.) for forming an EVOH layer, an acid-modified polypropylene (ADMER QF500 available from Mitsui Chemicals, Inc.) for forming an adhesive layer and polyamide 12 were prepared, and then were co-extruded into a hose shape by an extruder capable of simultaneous formation of four layers, so that a hose having a four-layer structure was produced wherein a polyamide 6 resin layer having an inner diameter of 6.0 mm and a thickness of 0.3 mm, an EVOH layer having a thickness of 0.1 mm formed on the outer peripheral surface thereof, an adhesive layer having a thickness of 0.1 mm formed on the outer peripheral surface thereof and a polyamide 12 resin layer having a thickness of 0.5 mm formed on the outer peripheral surface thereof. In turn, the inner and the outer peripheral surfaces of the hose were dipped into the coating liquid prepared in the same manner as in the Example 1 and vulcanized at 150° C. for 60 minutes for forming a coating layer having a thickness of 10 μm. Thus, an intended fuel hose, as shown in the FIGURE, was produced.

EXAMPLE 4

First, polyamide 12 and a polyphenylene sulfide (PPS) for forming a PPS layer were prepared, and then were co-extruded into a hose shape by an extruder capable of simultaneous formation of three layers, so that a hose having a three-layer structure was produced wherein a polyamide resin layer having an inner diameter of 6.0 mm and a thickness of 0.3 mm, a PPS layer having a thickness of 0.1 mm formed on the outer peripheral surface thereof and a polyamide resin layer having a thickness of 0.6 mm formed on the outer peripheral surface thereof. In turn, the inner and the outer peripheral surfaces of the hose were dipped into the coating liquid prepared in the same manner as in the Example 1 and vulcanized at 160° C. for 30 minutes for forming a coating layer having a thickness of 10 μm. Thus, an intended fuel hose, as shown in the FIGURE, was produced.

EXAMPLE 5

First, polyamide 12 and a modified vinylidene fluoride resin (modified PVDF) for forming a modified PVDF layer were prepared, and then were co-extruded into a hose shape by an extruder capable of simultaneous formation of three layers, so that a hose having a three-layer structure was produced wherein a polyamide resin layer having an inner diameter of 6.0 mm and a thickness of 0.3 mm, a modified PVDF layer having a thickness of 0.2 mm formed on the outer peripheral surface thereof and a polyamide resin layer having a thickness of 0.5 mm formed on the outer peripheral surface thereof. In turn, the inner and the outer peripheral surfaces of the hose were dipped into the coating liquid prepared in the same manner as in the Example 1 and vulcanized at 160° C. for 30 minutes for forming a coating layer having a thickness of 10 μm. Thus, an intended fuel hose, as shown in the FIGURE, was produced.

EXAMPLE 6

A coating liquid having 20% solid content (a material for forming an electrically conductive coating layer) was prepared by kneading 100 parts of fluororubber (DAI-EL G-801 available from DAIKIN INDUSTRIES, LTD.), 2 parts of 2,2-bis(4-hydroxyphenyl)perfluoropropane, 0.5 parts of 8-benzyl-1,8-diaza-bicyclo[5.4.0]-7-undecenium chloride, 20 parts of carbon black (Ketjen Black EC available from Ketjen Black International Company), 3 parts of magnesium oxide (Kyowa Mag #150 available from Kyowa Chemical Industry Co., Ltd.) and 6 parts of calcium hydroxide (CAL-Z available from Ohmi Chemical Industries, Ltd.) by means of a kneader, and further adding a solvent (MEK) thereto, and then mixing and stirring thereof. The intended fuel hose, as shown in the FIGURE, was produced in the same manner as in the Example 1, except that the thus prepared coating liquid was used instead of the coating liquid of the Example 1.

COMPARATIVE EXAMPLE 1

First, 15 parts of carbon black (Ketjen Black EC available from Ketjen Black International Company) was mixed with 100 parts of polyamide 12, and then stirred therewith for obtaining a material for forming an electrically conductive polyamide resin layer. The thus obtained material and polyamide 12 were prepared and then were extruded into a hose shape by a twin screw extruder. Thus, the fuel hose comprising an electrically conductive polyamide resin layer having an inner diameter of 6.0 mm and a thickness of 0.1 mm and a polyamide resin layer having a thickness of 0.9 mm formed on the outer peripheral surface thereof was produced.

COMPARATIVE EXAMPLE 2

First, 15 parts of carbon black (Ketjen Black EC available from Ketjen Black International Company) was mixed with 100 parts of polyamide 12, and then stirred therewith for obtaining a material for forming an electrically conductive polyamide resin layer. The thus obtained material, polyamide 12 and a modified vinylidene fluoride resin (modified PVDF) for forming a modified PVDF layer were prepared and then were extruded into a hose shape by an extruder capable of simultaneous formation of four layers, so that a hose having a four-layer structure was produced wherein an electrically conductive polyamide resin layer having an inner diameter of 6.0 mm and a thickness of 0.1 mm, a polyamide resin layer having a thickness of 0.2 mm formed on the outer peripheral surface thereof, a modified PVDF layer having a thickness of 0.2 mm formed on the outer peripheral surface thereof and a polyamide resin layer having a thickness of 0.5 mm formed on the outer peripheral surface thereof.

The fuel hoses of the Examples and the Comparative Examples thus produced were evaluated for characteristic properties thereof in the following manners. The results of the evaluation are shown in the following Table 1.

Sealing Property

Metal pipes (outer diameter: 8 mm, inner diameter: 6 mm, radius of cap end: 0.5) were installed into opposite ends of each hose and were thermally aged at 120° C. for 168 hours. Then, one end of the metal pipe was fitted with a vise and the hose was bent by 180 degrees. In turn, the hose was soaked in water and the air pressure was applied to the inside of the hose. The pressure was gradually increased. When the air bubbles leaked, the pressure was measured for the evaluation for the sealing property. In Table 1, the results of the evaluation for the sealing property are expressed by a symbol × which indicates that the air bubbles were observed at lower than 8.8 MPa, and a symbol ○ which indicates that the air bubbles were not observed at not lower than 8.8 MPa.

Flexibility

Each hose was wound around a cylinder (mandrel) having a diameter of 200 mm. The wound state was observed for evaluation. In Table 1, the symbol × indicates that kink (buckling) occurred, while the symbol ○ indicates that no kink (buckling) occurred.

Sour Gasoline Resistance

A model of degraded gasoline was prepared by blending 5 wt % of lauroyl peroxide (LPO) in Fuel C (50% by volume of toluene +50% by volume of isoctane). Then, two metal pipes were respectively press-fitted into opposite end portions of a 10 m long fuel hose. After the model of degraded gasoline was circulated through the fuel hose at 60° C. at a pressure of 0.3 MPa for eight hours via a pressure regulator, the model of degraded gasoline was filled in the fuel hose for 16 hours. After this cycle was repeated 20 times, a part of the fuel hose was sampled, bent by 180 degrees, and halved The inside of the sampled part was visually observed for the evaluation of the sour gasoline resistance. In Table 1, the symbol ○ indicates that no cracking was observed, and the symbol × indicates the fuel hose suffered from abnormalities such as cracking or fracture.

Electrical Conductivity

The surface resistivity on the inner periphery of the inner layer of each of the fuel hoses was measured in conformity with GM213. In Table 1, the results of the evaluation for the electrical conductivity are expressed by a symbol ○ which indicates that surface resistivity was not more than $1.0 \times 10^8$ Ω, and a symbol × which indicates that surface resistivity was more than $1.0 \times 10^8$ Ω.

TABLE 1

|  | Example | | | | | | Comparative Example | |
|---|---|---|---|---|---|---|---|---|
|  | 1 | 2 | 3 | 4 | 5 | 6 | 1 | 2 |
| Sealing property | ○ | ○ | ○ | ○ | ○ | ○ | X | X |
| Flexibility | ○ | ○ | ○ | ○ | ○ | ○ | ○ | ○ |
| Sour gasoline resistance | ○ | ○ | ○ | ○ | ○ | ○ | X | X |
| Electrical conductivity | ○ | ○ | ○ | ○ | ○ | ○ | ○ | ○ |

As can be understood from the aforesaid results, the fuel hoses of the Examples were excellent in sealing property, flexibility and sour gasoline resistance. Further, since each electrical conductivity of the inner periphery of the fuel hoses of the Examples was good, the fuel hoses of the Examples were excellent in antistatic property.

On the other hand, the fuel hoses of Comparative Examples 1 and 2 were good at electrical conductivity of the inner periphery thereof, however were inferior in sealing property and sour gasoline resistance.

The fuel hose of the present invention is advantageously employed as a fuel hose for transporting an automotive fuel such as a gasoline, an alcohol-containing gasoline (gasohol) and a diesel fuel.

What is claimed is:

1. A fuel hose comprising a polyamide resin inner layer and an electrically conductive coating layer which is formed by the following essential components (A) to (C):
    (A) fluororubber;
    (B) an electrically conductive agent; and
    (C) a crosslinking agent comprising (a) polyhydroxy aromatic compound and a quaternary ammonium salt or (b) an amine crosslinking agent,
    the electrically conductive coating layer being provided directly on the inner peripheral surface of the polyamide resin inner layer over the entire length thereof.

2. A fuel hose as set forth in claim 1, wherein the electrically conductive coating layer has a thickness of 3 to 20 μm.

3. A fuel hose as set forth in claim 1, wherein the electrically conductive coating layer has an electrical resistance of $1.0 \times 10^8$ Ω·cm or less.

4. A fuel hose as set forth in claim 2, wherein the electrically conductive coating layer has an electrical resistance of $1.0 \times 10^8$ Ω·cm or less.

5. A fuel hose comprising a polyamide resin inner layer and an electrically conductive coating layer which is formed by the following essential components (A) to (C):
    (A) fluororubber;
    (B) an electrically conductive agent; and
    (C) a crosslinking agent comprising (a) polyhydroxy aromatic compound and a quaternary ammonium salt or (b) or amine crosslinking agent,
    the electrically conductive coating layer being provided on the inner peripheral surface of the polyamide resin inner layer over the entire length thereof, the fuel hose further comprising a coating layer formed by the essential components (A) and (C), the coating layer being provided on an outer peripheral surface of the fuel hose.

6. A fuel hose as set forth in claim 5, wherein the electrically conductive coating layer has a thickness of 3 to 20 μm.

7. A fuel hose as set forth in claim 5, wherein the electrically conductive coating layer has an electrical resistance of $1.0 \times 10^8$ Ω·cm or less.

8. A fuel hose as set forth in claim 6, wherein the electrically conductive coating layer has an electrical resistance of $1.0 \times 10^8$ Ω·cm or less.

* * * * *